United States Patent [19]

Burkholder

[11] 4,249,815
[45] Feb. 10, 1981

[54] CAMERA WITH MEANS FOR ALLOWING PHOTOGRAPHY UNDER LOW LIGHT CONDITIONS

[76] Inventor: Nelson D. Burkholder, 604 Reasor Dr., Virginia Beach, Va. 23464

[21] Appl. No.: 34,395

[22] Filed: Apr. 30, 1979

[51] Int. Cl.³ .......................... G03B 9/28; G03B 9/40; G03B 19/00
[52] U.S. Cl. .................................. 354/241; 354/246; 354/354
[58] Field of Search ........................ 354/202, 241–244, 354/246, 249, 261, 354, 126, 83, 299, 306; 355/67–71

[56] References Cited

U.S. PATENT DOCUMENTS

| | | | |
|---|---|---|---|
| 3,573,912 | 4/1971 | Brown | 96/61 |
| 3,823,413 | 7/1974 | Cole | 354/126 X |
| 4,050,813 | 9/1977 | Koizumi et al. | 355/67 |
| 4,082,449 | 4/1978 | Lapchak et al. | 355/70 X |

*Primary Examiner*—George H. Miller, Jr.
*Assistant Examiner*—Thomas H. Tarcza
*Attorney, Agent, or Firm*—Bacon & Thomas

[57] ABSTRACT

A standard camera with means for using non-imaging light for activating the film when taking pictures in low light conditions. The film activating means consists of an LED strip mounted on the primary blind or blade of a focal plane shutter of a standard camera, and placed adjacent to the trailing edge thereof. The LED strip is illuminated when the shutter mechanism is activated and the strip will be moved across the film gate area to activate the film just before the light from the subject strikes the film to produce the image thereon. In this manner, none of the subject light is used for activating the film and a better picture results. The LED light can comprise three lights of blue, green and red and the brightness of these three lights may be individually controlled to obtain different photographic effects on the film.

34 Claims, 8 Drawing Figures

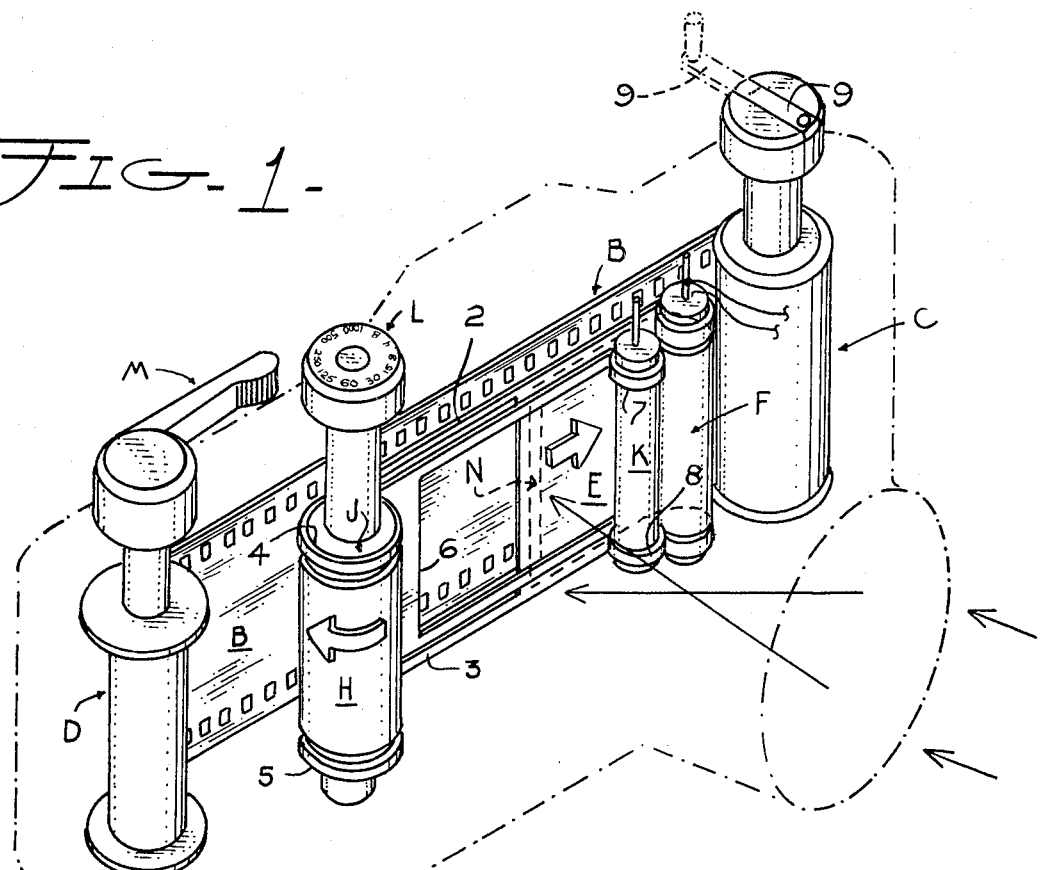
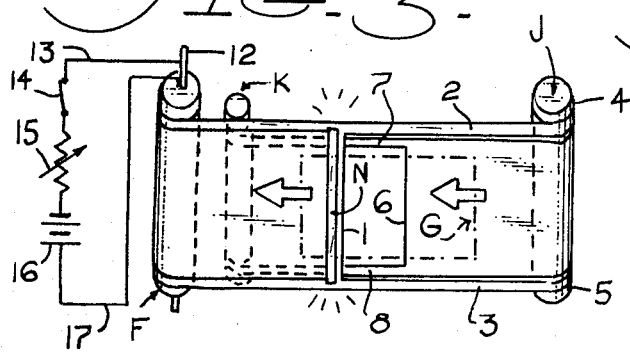
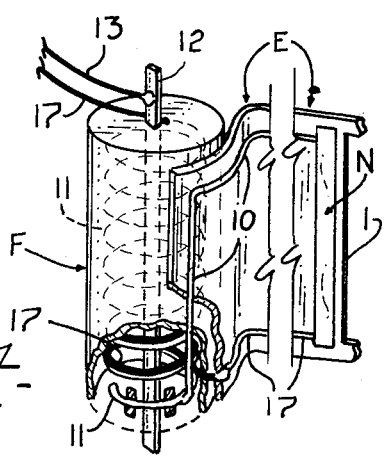
FIG-1.
FIG-2.
FIG-3.
FIG-4.

CAMERA WITH MEANS FOR ALLOWING PHOTOGRAPHY UNDER LOW LIGHT CONDITIONS

BACKGROUND OF THE INVENTION

1. Field of the Invention

It is known that photographic film has an undesirable characteristic in that a portion of the light that hits the film is used simply to activate the film and does not go into the producing of an image. An image or density is only formed on the film after this activation portion of "wasted" light has accumulated. It is also known that non-imaging light can be applied to the film immediately before, during or immediately after the imaging light so that the film will be activated and the imaging light can all be used in the formation of the image. This reduces the amount of light the camera needs to gather to produce a good image on the film.

The order in which the imaging and non-imaging light strikes the film is not critical providing both do so in very short periods of time because of the additive characteristics of photographic film. It is also known that cameras having their shutter a considerable distance in front of the film can be modified by using small lamps to shine evenly over the film to provide the non-imaging light.

Unfortunately this technique cannot be used with most of the 35 MM cameras because they have a focal plane shutter, immediately in front of the film. In order for a fixed light source to shine evenly over the film, it must be a significant distance away from the film. Since the focal plane shutter is always positioned quite close to the film, the fixed light source must be positioned such that it will shine through the shutter. Since the amount of light needed to activate a given film is fixed, the light source must be made brighter for short exposures and dimmer for long exposures. A typical range of shutter speeds for todays cameras is from 1 second to 1/1000 of a second. Therefore, a light source located ahead of the shutter would have to be variable by a factor of a thousand to be useful. None can vary by such an amount without dramatically shifting the color balance, making it impossible to use this technique for color film.

Considerable effort has gone into the development of "fast" photographic films and "fast" camera lenses in order to make it possible to take photographs in situations where the amount of light is low. It has been known for many years that photographic film requires a certain level of exposure to light before an image starts to form on the film. This activation energy of the film can be considered wasted light because it does not contribute directly to the formation of a visible image on the film. The activation energy required by a given film is constant and does not vary appreciably with the intensity of the light striking the film. Therefore, on a sunny day where there is plenty of light available, the portion of light wasted in activating the film is of no consequence because there is excess light available.

However, in situations of marginal light a large portion of the practical exposure time can be taken up in just providing the activation energy, and indeed, in certain situations it is difficult to expose the film long enough to supply enough light to the film to provide both the activation energy and the energy needed to form an image on the film. In these situations one would either not get a properly exposed image, or the exposure would be impractically long.

2. Description of the Prior Art

The patent to Herbert E. Bragg, U.S. Pat. No. 3,577,898, issued May 11, 1971, is for a supplemental illuminating of film plane in photographic cameras. This patent describes a technique for adding non-imaging light by admitting light reflected by the subject through openings or fiber optics in a manner such that the light does not pass through the camera lens. This technique has the disadvantage that the non-imaging light is variable making it difficult to admit exactly the amount of light needed to activate or sensitize the film. It also has the disadvantage that the non-image light is lowest under low light conditions when a brighter light is needed most.

The patent to Melrose R. Cole, U.S. Pat. No. 3,823,413, issued July 9, 1974, on a film speed enhancement camera, provides a non-imaging light by lamps positioned around the rear of the camera lens. While it is an improvement over the use of reflected light, the use of lamps in front of the focal plane shutter means that the intensity of the lamps must vary dramatically to admit the same amount of light to the film over a wide range of shutter speeds. This adds complexity to the camera that is undersirable and causes shifts in the color of the light source from redish in color at low light intensities to bluish at high light intensities. This will make the use of color film nearly impossible.

SUMMARY OF THE INVENTION

I have found an improved way to provide the required amount of light and to spread it evenly over the film immediately prior to or following the exposure of the film without such color balance problems. I mount a strip or strips of light such as light emitting diodes (LEDs) on the moveable shutter so that this light sweeps across the film surface preferably just before actual exposure of the film takes place. This will expose the film to a light that will activate it to a threshold level, or on either side thereof, so that all of the light from the subject during the exposure period is used for producing an image on the film.

An object of my invention is to provide a controlled light source such as a strip of LED's or electroluminescent material, and attach the strip to a shutter blind or blade so that the light will be directed toward the film. The light source will be turned on when the shutter is tripped and the shutter will scan the light strip across the film area and activate the film during the picture taking process. Since the focal plane shutter moves across the film area at a constant speed, regardless of the "shutter speed", there is no need to vary the light intensity with the shutter speed.

A further object of my invention is to balance the light source for the color characteristics of color film. This is done by chosing an assortment of lamps (such as LED's) which will have in sum the desired color balance and/or using corrective filtration to get the proper color balance. A variable resistor in the LED's light circuit can vary the light intensity to adjust the amount of non-imaging light slightly to meet the needs of different films.

It is a further object of my invention to make possible the control of contrast on the film by increasing the intensity of the non-imaging light above that needed to activate the film. This will increase shadow detail in situations where subject contrast is too great for the film to handle.

BRIEF DESCRIPTION OF THE DRAWINGS

FIG. 1 is a schematic perspective showing of a standard camera using shutter blinds, with the LED strip of my invention mounted on the trailing edge of the primary blind so that this strip will traverse the film area and expose the film to a sufficient amount of light to activate the film. The film is shown at the rear of the shutter blinds;

FIG. 2 is a schematic view on a smaller scale and illustrates an exemplary wiring circuit between a battery and the LED light strip;

FIG. 3 is similar to FIG. 2, but shows the LED strip illuminated and traversing the film gate or picture area;

FIG. 4 is an enlarged schematic perspective showing the electrical connections between the LED strip and the wires that are connected to the battery;

DESCRIPTION OF THE PREFERRED EMBODIMENTS

Figure 5:
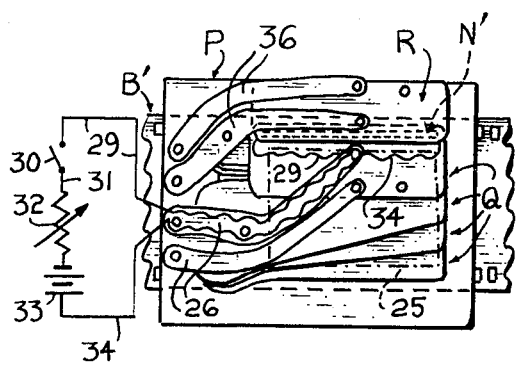
FIGS. 5, 6 and 7 are schematic views of a modified form of camera shutter where metal blades are used instead of the cloth blinds. The LED strip is attached to the leading blade of the primary shutter.

In carrying out my invention I make use of standard cameras using typical focal plane shutters shown schematically in FIGS. 1 to 7 inclusive. The outline of the camera is indicated by the phantom line A in FIG. 1. The film B is fed from the film cartridge C to the film take-up spool D. The primary blind E has one end wrapped around a spring loaded drum F, and the trailing edge 1 of the primary blind has a pair of tapes 2 and 3 which are positioned above and below the film gate or exposure opening G, and have their ends connected to the top and bottom drums 4 and 5 rotatable about a common axis. The area occupied normally by the film B in the imaging area is referred to herein as the film plane area. A secondary blind H, is wrapped around a drum J that is positioned between the drums 4 and 5 and rotates about the same axis as for the drums 4 and 5. The secondary blind H has a leading edge 6 and upper and lower tapes 7 and 8 extend from the blind H, and are wrapped around a spring loaded take-up spool K. The camera parts thus far mentioned are standard and are illustrated schematically.

A shutter speed dial L is operatively connected to the drum J for the secondary blind H, and the shutter speed can be determined by the setting of the dial. I have not shown the shutter speed dial and associate parts in detail because they are standard. A film wind lever when actuated will advance the film B, and wind it on the take-up spool D, and at the same time will cock the shutter mechanism so that when the camera starting button, not shown, is depressed the primary blind E will be wound upon the spring loaded drum F and will advance the trailing edge 1 of the blind to move across the film gate G and expose the film to the light from the subject. Then the secondary blind H will start moving after the elapsed time, set by the shutter speed dial L, has transpired and then the blind H will move at the same speed as the primary blind and will cause its leading edge 6 to move across the film gate to cut off the light from the subject. Since all of these parts are standard in a camera, I have only mentioned them briefly. The film cartridge C can be rewound at the end of the film and a rewind crank 9 is used for this purpose.

My invention consists in mounting an LED strip N or electroluminescent strip on the primary blind E of the focal plane shutter and positioning it adjacent to the trailing edge 1 of the blind and parallel therewith so that the LED strip would sweep across the film gate G in front of the film plane area when the camera shutter was activated and the light from the LED would sensitize the film just prior to the light from the subject striking the film. In FIGS. 3 and 4, I show the primary blind E, connected to the spring loaded drum F. One wire 10 is connected to one end of the LED strip N, and has its other end connected to the coil spring 11, in the drum, the spring in turn being connected to the drum shaft 12 and another wire 13 connected to the shaft. Both FIGS. 2 and 3 show the wire 13 connected to a switch 14 which in turn is in series with a variable resistance 15 and a battery 16. Another insulated wire 17 leads from the battery 16 and is wrapped around the convolutions of the spring 11 but is insulated therefrom. This covered wire 17 then extends from the coil spring and drum F and is connected to the opposite end of the LED strip N. The arrangement is such that when the shutter trip button, not shown, is depressed to activate the camera shutter, the switch 14 will also be closed to form a circuit that will illuminate the LED strip N so that as the trailing edge 1 of the blind will traverse the film gate and activate a frame of the film B, so that all of the light from the subject will be utilized in producing an image on the film.

As already stated, the secondary blind H will start moving after the preset time period has elapsed and will move at the same speed as the primary blind so that the leading edge 6 of the primary blind will traverse the film gate G and will close off the light from the subject to the film B. The switch 14 will automatically be opened so as to cut off the current to the LED strip N. The camera is now ready to be recocked by swinging the lever M to move another section of film B into registration with the film gate G, and to return the pimary and secondary blinds E and H to their starting positions outside the picture area near drum J. Schematic FIG. 2 shows the arrangement of the two blinds E and H before they start moving across the film gate area G, while FIGS. 1 and 3, show both the pimary and secondary blinds moving across the gate area and the switch 14 is shown closed in FIG. 3 with the LED strip N illuminated for activating the film.

Figure 6:
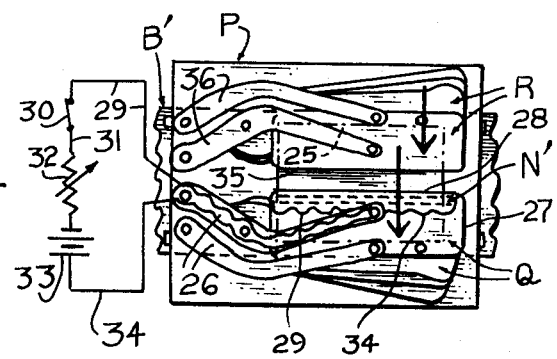
Figure 7:
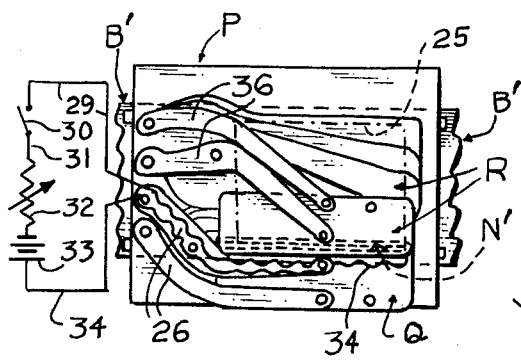

In FIGS. 5, 6 and 7, I show my invention used with a metal blade type focal plane shutter. FIG. 5 illustrates schematically a film B' movable in back of the shutter frame P, and this frame has a film gate opening 25, shown by the phantom lines. The primary and secondary metal blades are of standard construction and the primary metal blades Q in FIG. 5 cover the film gate 25. The spring biased pivoted arms 26 are cocked and ready to expose the film gate to the light from the subject, so that the image of the subject will be produced on the film portion registering with the film gate.

FIG. 6 shows the primary metal shutter blades A partially moved across the width of the film gate opening 25. The top blade 27 carries the LED strip N, indicated by dotted lines, and this strip is positioned parallel and adjacent to the trailing edge 28 of the metal blade 27. A wire 29 leads from one end of the LED strip N', and along one of the pivoted arms 26 to a switch 30 that is closed when the camera push button, not shown, is depressed. A wire 31 leads from the switch 30 to a variable resistance 32, and a battery 33. Then a wire 34 extends from the battery to the opposite end of the LED strip N'.

The standard focal plane secondary metal blades R will start moving across the film gate opening after a preset time interval and the leading blade 35, see FIG. 6, will have its leading edge automatically spaced the desired distance from the trailing edge 28 on the primary top blade 27 so that the required amount of light from the subject will strike the film. The point to keep in mind is that the light from the LED strip N' will activate the film B' just prior to the time the light from the subject passes through the opening between the two shutters, as they traverse the width of the film gate opening 25. The secondary metal blades R, are actuated by spring biased pivoted arms 36 in the customary manner.

Figure 8:
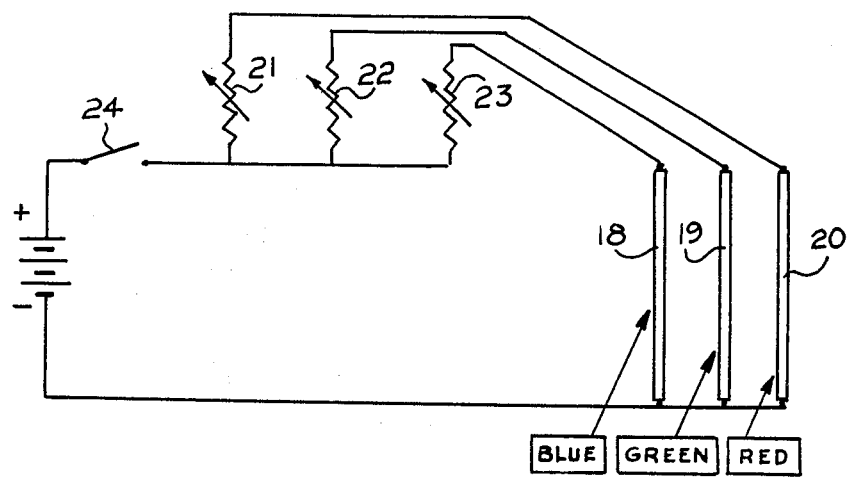
FIG. 8 is an electrical circuit using blue, green and red LED's with individual rheostat controls for individually varying the intensities of these three different colors. This circuit can be used with either the blind type shutter or the blade type shutter.

I show in FIG. 8 a schematic arrangement for adjusting the color balance for the light given off by the LED strip N or N'. Instead of a single strip, the LED can comprise three lights; a blue light 18, a green light 19, and a red light 20. The intensities of these lights are each controlled by a variable resistance shown at 21, 22 and 23. A switch 24 connects the three lights to a source of current such as the battery shown in FIG. 8.

The three lights 18, 19 and 20 are arranged side by side and placed adjacent to the trailing edge 1 of the primary shutter curtain blind E of FIG. 1, or adjacent to the trailing edge 28 of the top plate 27 in the focal plane metal shutters Q and R. The color balance of the three light sources can be altered to accommodate both daylight and tungsten type films by switching on different portions of the three light source to achieve the average color temperature of light that is desirable. Other variations of this idea are possible and will be obvious to those skilled in the art.

I claim:

1. A camera comprising:
   (a) a film plane area in the camera, including an imaging area;
   (b) means for exposing the imaging area to imaging light;
   (c) an auxiliary non-imaging light source movably positioned in the camera;
   (d) means for causing the movable auxiliary light source to move across said imaging area;
   (e) whereby a film in the film frame area may be given a uniform increment of exposure to light in addition to the imaging light.

2. The camera as claimed in claim 1, including a focal plane shutter having a movable part, and wherein the said auxiliary light source is attached to and movable with the movable part of said focal plane shutter.

3. The camera as claimed in claim 1 or 2, wherein said auxiliary light source comprises at least one strip of light emitting diodes.

4. The camera as claimed in claim 1 or 2, wherein said auxiliary light source comprises at least one strip of electroluminescent material.

5. The camera as claimed in claim 1, including means for varying the color balance of said auxiliary light source.

6. The camera as claimed in claim 5, said means for varying the color balance of said auxiliary light source comprising different colored light sources and means for varying the intensity of said different colored light sources.

7. The camera as claimed in claim 6, wherein said different colored light sources comprise strips of light emitting diodes.

8. The camera as claimed in claim 1, including a film gate in front of the film plane, and wherein said auxiliary light source is arranged to uniformly illuminate the entire film gate area during its movement past the imaging area.

9. The camera as claimed in claim 1, including means for varying the intensity of said auxiliary light source.

10. The camera as claimed in claim 1, including a power supply for said auxiliary light source.

11. The camera as claimed in claim 10, including means for varying the power supply to said auxiliary light source from said power supply.

12. In a camera including a focal plane shutter having a movable part located adjacent a film gate through which imaging light passes to expose a light sensitive film frame, and an auxiliary light source in the camera, the improvement comprising:
   means for moving the light source to cause same to move across said film gate and to project non-imaging light through the film gate area in the same direction as the imaging light.

13. The improvement in a camera as claimed in claim 12, said auxiliary light source comprising an elongated element having a narrow dimension that is smaller than the film gate in the direction of auxiliary light source motion and a longer dimension corresponding at least to the maximum film gate dimension in a transverse direction relative to the direction of auxiliary light source motion.

14. The improvement in a camera as claimed in claim 12, wherein the illumination from said auxiliary light source is of variable intensity.

15. The improvement in a camera as claimed in claim 14, including control means for varying the intensity of said auxiliary light source.

16. The improvement in a camera as claimed in claim 12 or 15, said auxiliary light source comprising one or more light emitting diodes.

17. The improvement in a camera as claimed in claim 12, said means for causing said auxiliary light source to move across said film gate comprising said movable part of said shutter.

18. The improvement in a camera as claimed in claim 17, said movable part of the shutter comprising a movable curtain having an open area through which imaging light passes, said auxiliary light source connected to said movable curtain for movement therewith.

19. An improvement in a camera as claimed in claim 18, said auxiliary light source disposed adjacent one edge of said open area, said edge fully moving across the film gate.

20. The improvement in a camera as claimed in claim 17, including a power supply connection for said auxiliary light source, said power supply connection comprising at least one electrical connector movable with said movable curtain, and means for supplying electrical energy to said connector.

21. The improvement in a camera as claimed in claim 17, said shutter comprising a movable blade having an edge that moves across the film gate, said auxiliary light source connected to said blade for movement therewith.

22. The improvement in a camera as claimed in claim 12, said auxiliary light source comprising means for varying the color balance of light emitted thereby.

23. The improvement in a camera as claimed in claim 22, said means for varying the color balance of said auxiliary light source comprising multiple light sources of different colors, each light source having an independent intensity control means.

24. The improvement in a camera as claimed in claim 22, wherein the colors of said multiple light sources are red, blue, and green.

25. The improvement in a camera as claimed in claim 12, including means for causing the auxiliary light source to move across said film gate at a uniform velocity.

26. The method of activating light sensitive film in a camera arranged to expose a stationary frame of the film to imaging light from an object outside the camera, comprising:
uniformly exposing the stationary film frame to light from a moving auxiliary light source within the camera.

27. The method as claimed in claim 26, including exposing the film frame to light from said auxiliary light source immediately before exposing the film frame to imaging light.

28. The method as claimed in claim 26, wherein the exposure to activating light is carried out by moving the auxiliary light source across the film frame.

29. The method as claimed in claim 28, including using an auxiliary light source in strip format, the strip extending traversely across the film frame area during traversal movement of the auxiliary light source.

30. The method as claimed in claim 26, including using an auxiliary light source having means associated therewith for varying the color balance of said auxiliary light source.

31. The method as claimed in claim 26, including using an auxiliary light source having means associated therewith for controlling its intensity.

32. The method as claimed in claim 26, including using one or more light emitting diodes as said auxiliary light sources.

33. The method as claimed in claim 30, including using differently colored auxiliary light sources, and means for varying the intensity of the differently colored light sources, as said means for varying the color balance of said auxiliary light source.

34. The method as claimed in claim 28, the camera also including a shutter having a movable part for varying the time of exposure of the film frame to imaging light, the motion of the auxiliary light source being carried out by using a light source attached to the movable part of the shutter.

* * * * *